United States Patent
Huang et al.

(10) Patent No.: US 10,492,152 B2
(45) Date of Patent: Nov. 26, 2019

(54) PHR SENDING METHOD AND USER TERMINAL

(71) Applicant: HUAWEI TECHNOLOGIES CO., LTD., Shenzhen (CN)

(72) Inventors: Qufang Huang, Shanghai (CN); Jian Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 27 days.

(21) Appl. No.: 15/965,848

(22) Filed: Apr. 28, 2018

(65) Prior Publication Data

US 2018/0249428 A1 Aug. 30, 2018

Related U.S. Application Data

(63) Continuation of application No. PCT/CN2016/103232, filed on Oct. 25, 2016.

(30) Foreign Application Priority Data

Oct. 30, 2015 (CN) .......................... 2015 1 0728686

(51) Int. Cl.
*H04W 4/00* (2018.01)
*H04W 52/36* (2009.01)
(Continued)

(52) U.S. Cl.
CPC .......... *H04W 52/365* (2013.01); *H04W 52/34* (2013.01); *H04W 72/02* (2013.01); *H04W 72/0446* (2013.01)

(58) Field of Classification Search
CPC ... H04W 52/365; H04W 52/34; H04W 72/02; H04W 72/0446
See application file for complete search history.

(56) References Cited

U.S. PATENT DOCUMENTS 9,913,155 B2    3/2018  Lee et al.
2010/0273515 A1* 10/2010 Fabien .................... H04L 5/006
                                                                455/509
(Continued)

FOREIGN PATENT DOCUMENTS

CN      104936222 A    9/2015
CN      105407524 A    3/2016
(Continued)

*Primary Examiner* — Chi H Pham
*Assistant Examiner* — Fahmida S Chowdhury
(74) *Attorney, Agent, or Firm* — Kilpatrick Townsend & Stockton LLP (57) ABSTRACT

Embodiments of the present invention provide a PHR sending method and a user terminal. The method includes: receiving, by a user terminal, information about an uplink resource set, where the uplink resource set includes uplink resources in at least two cells, TTI lengths of the two cells are different, each uplink resource in the uplink resource set is an uplink resource that is located within duration of a first TTI, and the first TTI is a TTI in a cell that has a maximum TTI length and in which the user terminal is located; determining, by the user terminal, a target uplink resource, where the target uplink resource is an uplink resource that has an earliest start time and that is located within the duration of the first TTI; and sending, by the user terminal, a power headroom report on the target uplink resource.

15 Claims, 4 Drawing Sheets

(51) Int. Cl.
*H04W 52/34* (2009.01)
*H04W 72/02* (2009.01)
*H04W 72/04* (2009.01)

(56) References Cited

U.S. PATENT DOCUMENTS

| | | | |
|---|---|---|---|
| 2012/0044882 A1* | 2/2012 | Kim | H04L 5/0058 370/329 |
| 2014/0018124 A1* | 1/2014 | Ahn | H04W 24/10 455/522 |
| 2016/0073360 A1* | 3/2016 | Uchino | H04W 24/10 370/329 |
| 2016/0255594 A1* | 9/2016 | Vajapeyam | H04W 52/346 455/522 |
| 2016/0323887 A1* | 11/2016 | Patel | H04W 52/365 |
| 2017/0150458 A1 | 5/2017 | Yang et al. | |

FOREIGN PATENT DOCUMENTS

| | | |
|---|---|---|
| WO | 2012056273 A1 | 5/2012 |
| WO | 2015139795 A1 | 9/2015 |

* cited by examiner

PHR SENDING METHOD AND USER TERMINAL

CROSS-REFERENCE TO RELATED APPLICATIONS

This application is a continuation of International Application No. PCT/CN2016/103232, filed on Oct. 25, 2016, which claims priority to Chinese Patent Application No. 201510728686.0, filed on Oct. 30, 2015. The disclosures of the aforementioned applications are hereby incorporated by reference in their entireties

TECHNICAL FIELD

The present invention relates to the field of communications technologies, and in particular, to a PHR sending method and a user terminal.

BACKGROUND

In a long term evolution (English: Long Term Evolution, LTE for short) communications system, an uplink resource that is required by user equipment (English: User Equipment, UE for short) to send uplink data needs to be allocated by a base station. The UE can send the uplink data to the base station only after the UE obtains the uplink resource allocated by the base station. When allocating the uplink resource to the UE, the base station needs to consider information such as a data volume of the UE, a distance between the UE and the base station, and a category of the UE. The uplink resource includes uplink sending bandwidth.

After obtaining the uplink resource allocated by the base station, the UE calculates sending power that is required for sending the uplink data. The sending power may be simply represented as a product of power spectral density and uplink sending bandwidth. When the UE is relatively distant from the base station, relatively large power spectral density is required to ensure decoding accuracy. Due to a limitation of a hardware condition of the UE, the UE has upper limit power. When sending power calculated by the UE is greater than the upper limit power of the UE, the UE sends the uplink data by using the upper limit power of the UE. The UE further calculates power headroom (English: Power Headroom, PH for short), where the PH is a difference between the upper limit power of the UE and the calculated sending power, and the UE sends a power headroom report (English: Power Headroom Report, PHR for short) to the base station, so that the base station refers to the PH of the UE when allocating the uplink resource to the UE next time. The PHR includes PH of all activated cells (English: cell) in which the UE is located.

Before the UE sends the PHR to the base station, the base station also needs to allocate the uplink resource to the UE for sending the PHR. However, all the activated cells in which the UE is located may include a first cell and a second cell, and a TTI length of the first cell is at least twice a TTI length of the second cell. In this case, there is no solution about how to send the PHR in the prior art.

SUMMARY

Embodiments of the present invention provide a PHR sending method and a user terminal, so as to definitely determine a behavior of user terminal for sending a PHR.

A first aspect of the embodiments of the present invention provides a PHR sending method, including:

receiving, by a user terminal, information about an uplink resource set, where the uplink resource set includes uplink resources in at least two cells, TTI lengths of the two cells are different, each uplink resource in the uplink resource set is an uplink resource that is located within duration of a first TTI, and the first TTI is a TTI in a cell that has a maximum TTI length and in which the user terminal is located;

determining, by the user terminal, a target uplink resource, where the target uplink resource is an uplink resource that has an earliest start time and that is located within the duration of the first TTI;

obtaining, by the user terminal, a power headroom report; and sending, by the user terminal, the power headroom report on the target uplink resource.

With reference to the first aspect, in a first possible implementation of the first aspect, the uplink resource set includes a first uplink resource and a second uplink resource, the first uplink resource is located in a cell that has a minimum TTI length and in which the user terminal is located, the first uplink resource is located in an earliest TTI within the duration of the first TTI, and the second uplink resource is located in the first TTI; and the determining, by the user terminal, a target uplink resource includes:

determining the first uplink resource as the target uplink resource.

With reference to the first aspect, in a second possible implementation of the first aspect, the user terminal is located in a first cell and a second cell, the first cell is a cell in which the first TTI is located, and a TTI length of the first cell is at least twice a TTI length of the second cell; and when the target uplink resource is located in the first TTI, the obtaining, by the user terminal, a power headroom report includes:

calculating, by the user terminal, power headroom of the first cell, where the power headroom of the first cell is calculated according to sending bandwidth of the first TTI; and calculating, by the user terminal, power headroom of the second cell, where the second cell has PUSCH transmission within the duration of the first TTI, the power headroom of the second cell=maximum sending power of the user terminal−a PUSCH sending power average value of a preset TTI set in the second cell−a preset parameter, the preset parameter is 0, or the preset parameter includes virtual transmission power of the second cell, or the preset parameter includes PUCCH transmission power of the second cell, and a TTI in the preset TTI set is located within the duration of the first TTI.

With reference to the first aspect, in a third possible implementation of the first aspect, the user terminal is located in a first cell and a second cell, the first cell is a cell in which the first TTI is located, and a TTI length of the first cell is at least twice a TTI length of the second cell; and when the target uplink resource is located in the first TTI, the obtaining, by the user terminal, a power headroom report includes:

calculating, by the user terminal, power headroom of the first cell, where the power headroom of the first cell is calculated according to sending bandwidth of the first TTI; and calculating, by the user terminal, power headroom of the second cell, where the second cell has PUSCH transmission within the duration of the first TTI, the power headroom of the second cell=maximum sending power of the user terminal−a PUSCH sending power maximum value of a preset TTI set in the second cell−a preset parameter, the preset parameter is 0, or the preset parameter includes virtual transmission power of the second cell, or the preset parameter includes PUCCH transmission power of the second cell, and the preset TTI set is located within the duration of the first TTI.

With reference to the first aspect, in a fourth possible implementation of the first aspect, the user terminal is located in a first cell and a second cell, the first cell is a cell in which the first TTI is located, and a TTI length of the first cell is at least twice a TTI length of the second cell; and when the target uplink resource is located in the second cell, the method further includes:

after a subframe in the first TTI ends, starting a periodicPHR-Timer and a prohibitPHR-Timer.

A second aspect of the embodiments of the present invention provides a user terminal, including:

a receiving module, configured to receive information about an uplink resource set, where the uplink resource set includes uplink resources in at least two cells, TTI lengths of the two cells are different, each uplink resource in the uplink resource set is an uplink resource that is located within duration of a first TTI, and the first TTI is a TTI in a cell that has a maximum TTI length and in which the user terminal is located;

a determining module, configured to determine a target uplink resource, where the target uplink resource is an uplink resource that has an earliest start time and that is located within the duration of the first TTI;

an obtaining module, configured to obtain a power headroom report; and a sending module, configured to send the power headroom report on the target uplink resource.

With reference to the second aspect, in a first possible implementation of the second aspect, the uplink resource set includes a first uplink resource and a second uplink resource, the first uplink resource is located in a cell that has a minimum TTI length and in which the user terminal is located, the first uplink resource is located in an earliest TTI within the duration of the first TTI, and the second uplink resource is located in the first TTI; and the determining module is specifically configured to determine the first uplink resource as the target uplink resource.

With reference to the second aspect, in a second possible implementation of the second aspect, the user terminal is located in a first cell and a second cell, the first cell is a cell in which the first TTI is located, and a TTI length of the first cell is at least twice a TTI length of the second cell; and when the target uplink resource is located in the first TTI, the obtaining module is specifically configured to:

calculate power headroom of the first cell, where the power headroom of the first cell is calculated according to sending bandwidth of the first TTI; and calculate power headroom of the second cell, where the second cell has PUSCH transmission within the duration of the first TTI, the power headroom of the second cell=maximum sending power of the user terminal−a PUSCH sending power average value of a preset TTI set in the second cell−a preset parameter, the preset parameter is 0, or the preset parameter includes virtual transmission power of the second cell, or the preset parameter includes PUCCH transmission power of the second cell, and a TTI in the preset TTI set is located within the duration of the first TTI.

With reference to the second aspect, in a third possible implementation of the second aspect, the user terminal is located in a first cell and a second cell, the first cell is a cell in which the first TTI is located, and a TTI length of the first cell is at least twice a TTI length of the second cell; and when the target uplink resource is located in the first TTI, the obtaining module is specifically configured to:

calculate power headroom of the first cell, where the power headroom of the first cell is calculated according to sending bandwidth of the first TTI; and calculate power headroom of the second cell, where the second cell has PUSCH transmission within the duration of the first TTI, the power headroom of the second cell=maximum sending power of the user terminal−a PUSCH sending power maximum value of a preset TTI set in the second cell−a preset parameter, the preset parameter is 0, or the preset parameter includes virtual transmission power of the second cell, or the preset parameter includes PUCCH transmission power of the second cell, and the preset TTI set is located within the duration of the first TTI.

With reference to the second aspect, in a fourth possible implementation of the second aspect, the user terminal is located in a first cell and a second cell, the first cell is a cell in which the first TTI is located, and a TTI length of the first cell is at least twice a TTI length of the second cell; and when the target uplink resource is located in the second cell, the user terminal further includes:

a start module, configured to: after a subframe in the first TTI ends, start a periodicPHR-Timer and a prohibitPHR-Timer. It can be learned from the foregoing technical solutions that the embodiments of the present invention have the following advantages:

In the embodiments, when the uplink resource set includes at least two uplink resources in cells that have different TTI lengths, and when each uplink resource in the uplink resource set is an uplink resource located within duration of a TTI in a cell that has a maximum TTI length and in which the user terminal is located, according to a stipulation, the user terminal determines, from the uplink resource set allocated by the base station, an uplink resource that has an earliest start time as a target uplink resource, and sends the PHR on the target uplink resource. This can definitely determine a behavior of the user terminal for sending the PHR.

DESCRIPTION OF EMBODIMENTS

To make persons skilled in the art understand the technical solutions in the present invention better, the following describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", "third", "fourth", and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
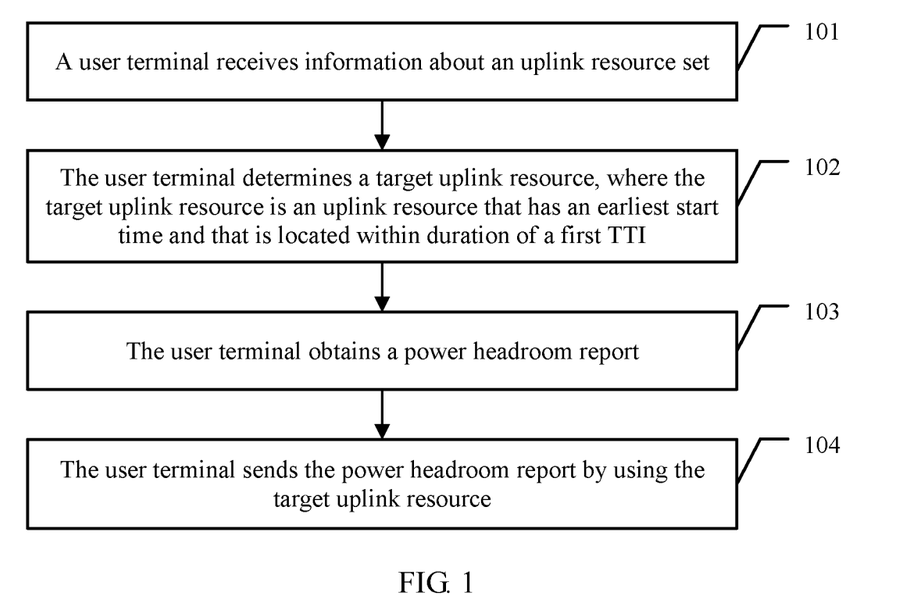
FIG. 1 is a schematic structural diagram of an embodiment of a PHR sending method according to an embodiment of the present invention.

Referring to FIG. 1, FIG. 1 is a schematic structural diagram of an embodiment of a PHR sending method according to an embodiment of the present invention. As shown in FIG. 1, the PHR sending method in this embodiment includes the following steps.

101. A user terminal receives information about an uplink resource set.

In this embodiment, the user terminal is located in at least two cells, and the user terminal uses a carrier aggregation technology, and may simultaneously use resources of the at least two cells to perform communication. Specifically, the at least two cells include a first cell and a second cell. A TTI length of the first cell is a maximum TTI length in cells in which the user terminal is located, the TTI length of the first cell is at least twice a TTI length of the second cell, and the TTI length of the first cell may or may not be an integer multiple of the TTI length of the second cell.

Before the user terminal sends a PHR to a base station, the base station allocates an uplink resource to the user terminal, and the uplink resource is used by the user terminal to send the PHR. In practical application, the base station allocates at least one uplink resource to the user terminal, and the user terminal selects an uplink resource from the at least one uplink resource to send the PHR. For ease of description, the at least one uplink resource is referred to as an uplink resource set. The information about the uplink resource set is used to indicate each uplink resource in the uplink resource set. In this embodiment, each uplink resource in the uplink resource set is located within duration of a TTI of the first cell.

Figure 2:
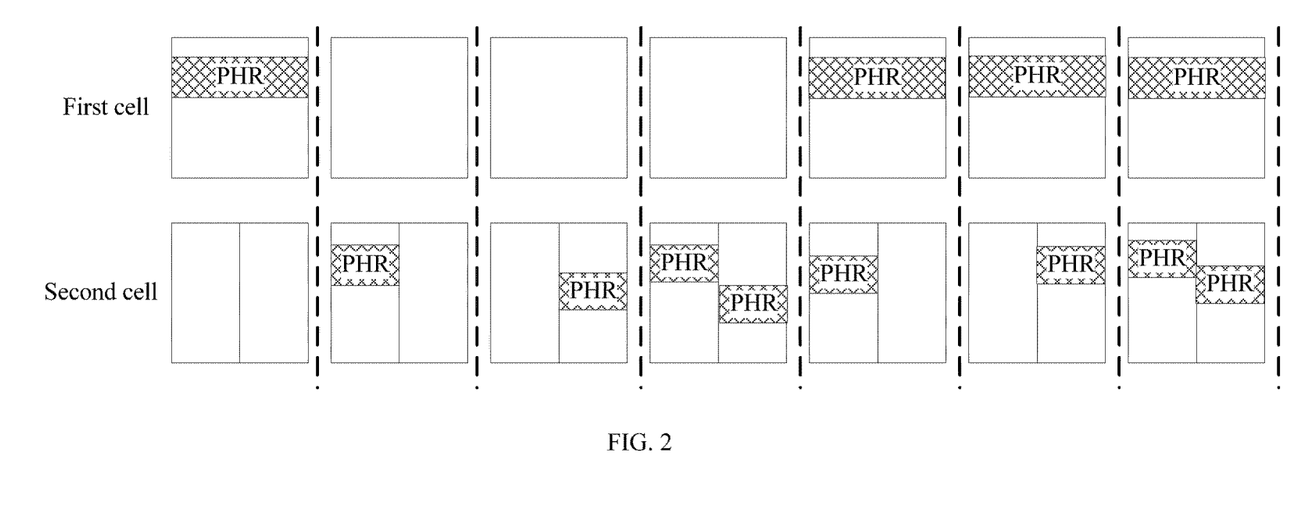
FIG. 2 is a schematic diagram of seven possible implementations of an uplink resource set in the embodiment shown in FIG. 1.

For ease of understanding, with reference to FIG. 2, an example in which a TTI length of the first cell is twice a TTI length of the second cell is used to describe seven possible cases in which each uplink resource in the uplink resource set is located within the duration of the TTI of the first cell. As shown in FIG. 2, each of seven squares in an upper row is used to represent one TTI of a first cell, and each of seven squares in a lower row is used to represent two TTIs of a second cell. A shaded part in a square represents an uplink resource that can be allocated by a base station to user terminal.

Two squares in a first column represent a first case: The uplink resource set includes one uplink resource, and the uplink resource is located in a TTI of the first cell.

Two squares in a second column represent a second case: The uplink resource set includes one uplink resource, and the uplink resource is located in a first TTI of the second cell.

Two squares in a third column represent a third case: The uplink resource set includes one uplink resource, and the uplink resource is located in a second TTI of the second cell.

Two squares in a fourth column represent a fourth case: The uplink resource set includes two uplink resources, and the two uplink resources are respectively located in a first TTI and a second TTI of the second cell.

Two squares in a fifth column represent a fifth case: The uplink resource set includes two uplink resources. One uplink resource is located in a TTI of the first cell, and the other uplink resource is located in a first TTI of the second cell.

Two squares in a sixth column represent a sixth case: The uplink resource set includes two uplink resources. One uplink resource is located in a TTI of the first cell, and the other uplink resource is located in a second TTI of the second cell.

Two squares in a seventh column represent a seventh case: The uplink resource set includes three uplink resources. One uplink resource is located in a TTI of the first cell, and the other two uplink resource is located in the second cell.

102. The user terminal determines a target uplink resource, where the target uplink resource is an uplink resource that has an earliest start time and that is located within duration of a first TTI.

After receiving the information about the uplink resource set, the user terminal determines, from the information about the uplink resource set, the target uplink resource to send the PHR. Specifically, the user terminal may select an uplink resource within duration of any TTI in the first cell. When the user terminal selects an uplink resource within duration of one of TTIs in the first cell, if there are at least two uplink resources within the duration, the user terminal selects an uplink resource that has an earliest start time from the uplink resources. As shown in FIG. 2, in the fourth case, an uplink resource in a second TTI of the second cell is selected as a target uplink resource, and in the sixth case, an uplink resource in a TTI of the first cell is selected as a target uplink resource.

When there are at least two uplink resources that have the earliest start time, any one of the at least two uplink resources may be selected as a target uplink resource. For example, in the fifth case and the seventh case shown in FIG. 2, an uplink resource in a TTI of the first cell or an uplink resource in a first TTI of the second cell is selected as a target uplink resource.

103. The user terminal obtains a power headroom report.

In this embodiment, because the user terminal uses a carrier aggregation technology, the PHR needs to include PH of all activated cells in which the user terminal is located when the user terminal sends the PHR, so that the base station makes reference when allocating an uplink resource to the user terminal next time. For example, when the user terminal is simultaneously located in the first cell and the second cell, the PHR sent by the user terminal to the base station includes PH of the first cell and PH of the second cell.

In this embodiment, when a cell in which the target uplink resource is located is the second cell, PH of the second cell when a PHR is sent is calculated according to sending bandwidth of a TTI in which the target uplink resource is located. The first cell calculates, according to sending bandwidth of a TTI corresponding to a time period of a target uplink resource, PH of the first cell when the PHR is sent. A specific calculation method is the prior art, and details are not described herein.

When a cell in which the target uplink resource is located is the first cell, PH of the first cell when a PHR is sent is calculated according to sending bandwidth of a TTI in which the target uplink resource is located. Duration of a TTI of the first cell (that is, duration of sending a PHR) includes at least two TTIs of the second cell. Therefore, there are multiple methods of calculating PH of the second cell.

Optionally, when there is no physical uplink shared channel (English: Physical Uplink Shared Channel, PUSCH for short) transmission in the second cell within duration of sending a PHR (the first case shown in FIG. 2), PH of the second cell=maximum sending power of the user terminal−a preset parameter.

The preset parameter may be 0, or includes virtual transmission power of the second cell, or includes PUCCH transmission power of the second cell, and this is not limited herein.

When there is PUSCH transmission in the second cell within duration of sending a PHR (the second case to the sixth case shown in FIG. 2), optionally, PH of the second cell=maximum sending power of the user terminal−a PUSCH sending power average value of a preset TTI set in the second cell−a preset parameter. Each TTI in the preset TTI set is located within the duration of the TTI of the first cell (that is, the duration of sending a PHR).

For example, within the duration of the TTI in the first cell (that is, the duration of sending a PHR), there are M TTIs in total in the second cell. The preset TTI set may be the M TTIs, and then PUSCH sending power average value of the preset TTI set in the second cell is specifically a ratio of a sum of PUSCH sending power of the M TTIs to M. Alternatively, the preset TTI set may be N (N is an integer less than M and greater than 0) TTIs in the M TTIs, and then a PUSCH sending power average value of the preset TTI set in the second cell is specifically a ratio of a sum of PUSCH sending power of the N TTIs to N. Alternatively, the preset TTI set may be an $n^{th}$ (n is an integer greater than 0 and less than M) TTI in the M TTIs, and then a PUSCH sending power average value of the preset TTI set in the second cell is specifically PUSCH sending power of the $n^{th}$ TTI.

The preset parameter may be 0, or includes virtual transmission power of the second cell, or includes PUCCH transmission power of the second cell, and this is not limited herein. A specific value of N may be set by the base station, or may be stipulated by a protocol, and this is not limited herein.

When there is an uplink resource allocated by a base station in the second cell within the duration of sending a PHR (the second case to the sixth case shown in FIG. 2), optionally, PH of the second cell=maximum sending power of the user terminal−a PUSCH sending power maximum value of a preset TTI set in the second cell−a preset parameter. Each TTI in the preset TTI set is located within the duration of the TTI of the first cell (that is, the duration of sending a PHR).

For example, within the duration of the TTI in the first cell (that is, the duration of sending a PHR), there are M TTIs in total in the second cell. The preset TTI set may be the M TTIs, and then a PUSCH sending power maximum value of the preset TTI set in the second cell is specifically a PUSCH sending power maximum value of the M TTIs. Alternatively, the preset TTI set may be N (N is an integer less than M and greater than 0) TTIs in the M TTIs, and then a PUSCH sending power maximum value of the preset TTI set in the second cell is specifically a PUSCH sending power maximum value of the N TTIs.

The preset parameter may be 0, or includes virtual transmission power of the second cell, or includes PUCCH transmission power of the second cell, and this is not limited herein. A specific value of N may be set by the base station, or may be stipulated by a protocol, and this is not limited herein.

104. The user terminal sends the power headroom report on the target uplink resource.

After determining the target uplink resource and obtaining the PHR, the user terminal sends the PHR to the base station on the target uplink resource.

In this embodiment, when the uplink resource set allocated by the base station to the user terminal includes at least two uplink resources in cells that have different TTI lengths, and when each uplink resource in the uplink resource set is an uplink resource located within duration of a TTI in a cell that has a maximum TTI length and in which the user terminal is located, according to a stipulation, the user terminal determines, from the uplink resource set allocated by the base station, an uplink resource that has an earliest start time as a target uplink resource, and sends the PHR on the target uplink resource. This can definitely determine a behavior of the user terminal for sending the PHR.

Further, this embodiment further provides a method for calculating PH of a short TTI cell when user terminal sends a PHR in a long TTI cell, so as to provide more detailed scheduling decision reference for the base station.

Optionally, in some possible implementations of the present invention, when the uplink resource set includes a first uplink resource and a second uplink resource, the first uplink resource is located in a cell that has a minimum TTI length and in which the user terminal is located, the first uplink resource is located in an earliest TTI within duration of the first TTI, and the second uplink resource is located in the first TTI, that is, when there are at least two uplink resources that have earliest start times within duration of a first TTI (the uplink resource in the first TTI of the second cell in the fifth case and the seventh case shown in FIG. 2), the first uplink resource is determined as the target uplink resource, that is, an uplink resource in a cell that has a minimum TTI length is determined as a target uplink resource.

In this way, because the first uplink resource is located in the cell that has the minimum TTI length, duration for sending the PHR is always covered by a TTI of another cell. Then, PH of the another cell may be calculated definitely according to sending bandwidth of the TTI that covers the first uplink resource, and this can relatively simply calculate PH of each cell.

In practical application, after sending the PHR, the user terminal starts two timers: a periodicPHR-Timer and a prohibitPHR-Timer. The periodicPHR-Timer is intended to prevent the PHR from being lost during sending. When the periodicPHR-Timer expires, the user terminal triggers the PHR again. The prohibitPHR-Timer is intended to prevent the user terminal from sending the PHR again in a short time. The user terminal sends the PHR again only when the prohibitPHR-Timer expires.

Optionally, in some possible implementations of the present invention, when the target uplink resource is located in the second cell, the method further includes: after a subframe in the first TTI ends, starting a periodicPHR-Timer and a prohibitPHR-Timer.

In an existing communications system, user terminal sends a BSR to a base station. The BSR is used to indicate a data volume of to-be-sent data of the user terminal. Specifically, the user terminal triggers the BSR to send the BSR after the BSR is triggered. The user terminal triggers the BSR to change an internal status of the user terminal, so as to indicate that the user terminal has the BSR to be sent. After receiving the BSR, the base station allocates an uplink resource to the user terminal. The user terminal sends the to-be-sent data to the base station by using the uplink resource. After sending the BSR, the user terminal changes the internal status to a state indicating that no BSR is triggered. Before the user terminal sends the BSR, the base station also needs to allocate the uplink resource to the BSR.

However, after a carrier aggregation technology is used, if the user terminal sends the BSR to the base station in a cell that has a relatively long TTI length, there may be a case in which after the base station receives the BSR sent by the user terminal, the user terminal has sent, to the base station in a cell that has a relatively short TTI length, the to-be-sent data indicated by the BSR. After receiving the BSR, the base station still allocates the uplink resource to the user terminal. This causes inconsistency between behaviors of the base station and the user terminal.

In the present invention, on a base station side, after receiving the BSR sent by the user terminal, the base station allocates, to the user terminal only according to a BSR that is sent by the user terminal in a cell that has a minimum TTI length, the uplink resource used to transmit the to-be-sent data indicated by the BSR. On a user terminal side, no limitation is imposed on a cell in which the user terminal sends the BSR, and the user terminal cancels BSR triggering only when the user terminal detects that there is no to-be-sent data in a cache, that is, the user terminal changes the internal status to the state indicating that no BSR is triggered.

The foregoing describes a PHR sending method in the present invention, and the following describes a user terminal for performing the PHR sending method.

Figure 3:
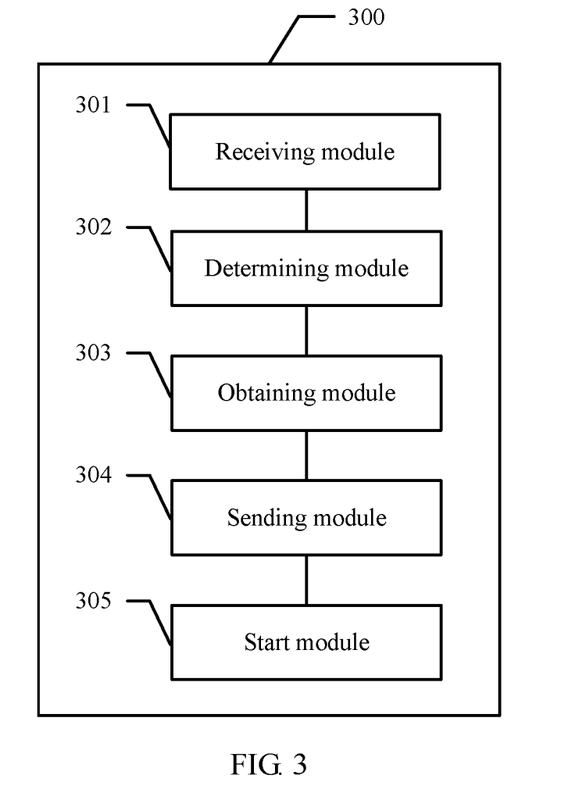
FIG. 3 is a schematic structural diagram of an embodiment of a user terminal according to an embodiment of the present invention.

Referring to FIG. 3, FIG. 3 is a schematic structural diagram of an embodiment of a user terminal according to an embodiment of the present invention. As shown in FIG. 3, a user terminal 300 in this embodiment includes:

a receiving module 301, configured to receive information about an uplink resource set, where the uplink resource set includes uplink resources in at least two cells, TTI lengths of the two cells are different, each uplink resource in the uplink resource set is an uplink resource that is located within duration of a first TTI, and the first TTI is a TTI in a cell that has a maximum TTI length and in which the user terminal is located;

a determining module 302, configured to determine a target uplink resource, where the target uplink resource is an uplink resource that has an earliest start time and that is located within the duration of the first TTI;

an obtaining module 303, configured to obtain a power headroom report; and a sending module 304, configured to send the power headroom report on the target uplink resource.

In this embodiment, when the uplink resource set that is received by the user terminal and allocated by the base station includes at least two uplink resources in cells that have different TTI lengths, and when each uplink resource in the uplink resource set is an uplink resource located within duration of a TTI in a cell that has a maximum TTI length and in which the user terminal is located, according to a stipulation, the user terminal determines, from the uplink resource set allocated by the base station, an uplink resource that has an earliest start time as a target uplink resource, and sends the PHR on the target uplink resource. This can definitely determine a behavior of the user terminal for sending the PHR.

In some possible implementations of the present invention, the uplink resource set includes a first uplink resource and a second uplink resource, the first uplink resource is located in a cell that has a minimum TTI length and in which the user terminal is located, the first uplink resource is located in an earliest TTI within the duration of the first TTI, and the second uplink resource is located in the first TTI.

The determining module 302 is specifically configured to determine the first uplink resource as the target uplink resource.

In some possible implementations of the present invention, the user terminal is located in a first cell and a second cell, the first cell is a cell in which the first TTI is located, and a TTI length of the first cell is at least twice a TTI length of the second cell.

When the target uplink resource is located in the first TTI, the obtaining module 303 is specifically configured to:

calculate power headroom of the first cell, where the power headroom of the first cell is calculated according to sending bandwidth of the first TTI; and calculate power headroom of the second cell, where the second cell has PUSCH transmission within the duration of the first TTI, the power headroom of the second cell=maximum sending power of the user terminal−a PUSCH sending power average value of a preset TTI set in the second cell−a preset parameter, the preset parameter is 0, or the preset parameter includes virtual transmission power of the second cell, or the preset parameter includes PUCCH transmission power of the second cell, and a TTI in the preset TTI set is located within the duration of the first TTI.

In some possible implementations of the present invention, the user terminal is located in a first cell and a second cell, the first cell is a cell in which the first TTI is located, and a TTI length of the first cell is at least twice a TTI length of the second cell.

When the target uplink resource is located in the first TTI, the obtaining module 303 is specifically configured to:

calculate power headroom of the first cell, where the power headroom of the first cell is calculated according to sending bandwidth of the first TTI; and calculate power headroom of the second cell, where the second cell has PUSCH transmission within the duration of the first TTI, the power headroom of the second cell=maximum sending power of the user terminal−a PUSCH sending power maximum value of a preset TTI set in the second cell−a preset parameter, the preset parameter is 0, or the preset parameter includes virtual transmission power of the second cell, or the preset parameter includes PUCCH transmission power of the second cell, and the preset TTI set is located within the duration of the first TTI.

In some possible implementations of the present invention, the user terminal is located in a first cell and a second cell, the first cell is a cell in which the first TTI is located, and a TTI length of the first cell is at least twice a TTI length of the second cell.

When the target uplink resource is located in the second cell, the user terminal further includes:

a start module 305, configured to: after a subframe in the first TTI ends, start a periodicPHR-Timer and a prohibit-PHR-Timer.

The foregoing describes the user terminal in this embodiment of the present invention from a perspective of a cellular functional entity, and the following describes the user terminal in this embodiment of the present invention from a perspective of hardware processing.

Figure 4:
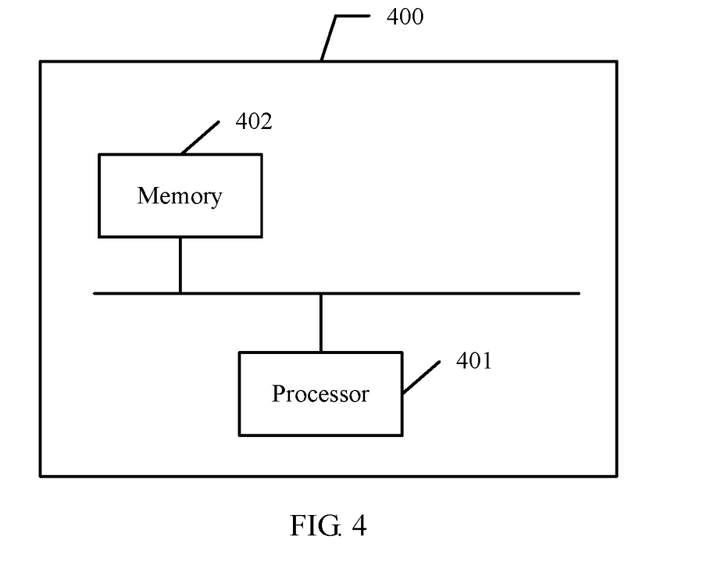
FIG. 4 is a schematic structural diagram of another embodiment of a user terminal according to an embodiment of the present invention.

Referring to FIG. 4, FIG. 4 is a schematic structural diagram of an embodiment of a user terminal according to an embodiment of the present invention. In this embodiment, a user terminal 400 includes:

a processor 401 and a memory 402 coupled to the processor 401, where the processor 401 reads a computer program stored in the memory 402, and is configured to perform the following operations:

receiving information about an uplink resource set, where the uplink resource set includes uplink resources in at least two cells, TTI lengths of the two cells are different, each uplink resource in the uplink resource set is an uplink resource that is located within duration of a first TTI, and the first TTI is a TTI in a cell that has a maximum TTI length and in which the user terminal is located;

determining a target uplink resource, where the target uplink resource is an uplink resource that has an earliest start time and that is located within the duration of the first TTI;

obtaining a power headroom report; and sending the power headroom report on the target uplink resource.

In some possible implementations of the present invention, the uplink resource set includes a first uplink resource and a second uplink resource, the first uplink resource is located in a cell that has a minimum TTI length and in which the user terminal is located, the first uplink resource is located in an earliest TTI within the duration of the first TTI, and the second uplink resource is located in the first TTI.

The determining a target uplink resource includes:

determining the first uplink resource as the target uplink resource.

In some possible implementations of the present invention, the user terminal is located in a first cell and a second cell, the first cell is a cell in which the first TTI is located, and a TTI length of the first cell is at least twice a TTI length of the second cell.

When the target uplink resource is located in the first TTI, the obtaining a power headroom report includes:

calculating power headroom of the first cell, where the power headroom of the first cell is calculated according to sending bandwidth of the first TTI; and calculating power headroom of the second cell, where the second cell has PUSCH transmission within the duration of the first TTI, the power headroom of the second cell=maximum sending power of the user terminal−a PUSCH sending power average value of a preset TTI set in the second cell−a preset parameter, the preset parameter is 0, or the preset parameter includes virtual transmission power of the second cell, or the preset parameter includes PUCCH transmission power of the second cell, and a TTI in the preset TTI set is located within the duration of the first TTI.

In some possible implementations of the present invention, the user terminal is located in a first cell and a second cell, the first cell is a cell in which the first TTI is located, and a TTI length of the first cell is at least twice a TTI length of the second cell.

When the target uplink resource is located in the first TTI, the obtaining a power headroom report includes:

calculating power headroom of the first cell, where the power headroom of the first cell is calculated according to sending bandwidth of the first TTI; and calculating power headroom of the second cell, where the second cell has PUSCH transmission within the duration of the first TTI, the power headroom of the second cell=maximum sending power of the user terminal−a PUSCH sending power maximum value of a preset TTI set in the second cell−a preset parameter, the preset parameter is 0, or the preset parameter includes virtual transmission power of the second cell, or the preset parameter includes PUCCH transmission power of the second cell, and the preset TTI set is located within the duration of the first TTI.

In some possible implementations of the present invention, the user terminal is located in a first cell and a second cell, the first cell is a cell in which the first TTI is located, and a TTI length of the first cell is at least twice a TTI length of the second cell.

When the target uplink resource is located in the second cell, the processor 401 is further configured to perform the following steps:

after a subframe in the first TTI ends, starting a periodicPHR-Timer and a prohibitPHR-Timer.

It may be clearly understood by persons skilled in the art that, for ease and brevity of description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A power headroom report (PHR) sending method applied for a user terminal, comprising:
   receiving information comprises uplink resources in at least two cells, wherein TTI lengths of the at least two cells are different, each uplink resource in the at least two cells is an uplink resource that is located within duration of a first TTI, and the first TTI is a TTI in a cell that has a maximum TTI length and in which the user terminal is located;
   determining a target uplink resource, wherein the target uplink resource is an uplink resource that has an earliest start time and that is located within the duration of the first TTI; and
   sending a PHR on the target uplink resource.

2. The PHR sending method according to claim 1, wherein the uplink resources in at least two cells comprise a first uplink resource and a second uplink resource, the first uplink resource is located in a cell that has a minimum TTI length and in which the user terminal is located, the first uplink resource is located in an earliest TTI within the duration of the first TTI, and the second uplink resource is located in the first TTI; and
   the determining a target uplink resource comprises:
   determining the first uplink resource as the target uplink resource.

3. The PHR sending method according to claim 1, wherein the user terminal is located in a first cell and a second cell, the first cell is a cell in which the first TTI is located, and a TTI length of the first cell is at least twice a TTI length of the second cell; and
   when the target uplink resource is located in the first TTI, the power headroom report is obtained in the following manner:
   calculating power headroom of the first cell, wherein the power headroom of the first cell is calculated according to sending bandwidth of the first TTI; and
   calculating power headroom of the second cell, wherein the second cell has PUSCH transmission within the duration of the first TTI,
   the power headroom of the second cell=maximum sending power of the user terminal-a PUSCH sending power average value of a preset TTI set in the second cell-a preset parameter,
   the preset parameter is 0, or the preset parameter comprises virtual transmission power of the second cell, or the preset parameter comprises PUCCH transmission power of the second cell, and
   a TTI in the preset TTI set is located within the duration of the first TTI.

4. The PHR sending method according to claim 1, wherein the user terminal is located in a first cell and a second cell, the first cell is a cell in which the first TTI is located, and a TTI length of the first cell is at least twice a TTI length of the second cell; and
   when the target uplink resource is located in the first TTI, the power headroom report is obtained in the following manner:
   calculating power headroom of the first cell, wherein the power headroom of the first cell is calculated according to sending bandwidth of the first TTI; and
   calculating power headroom of the second cell, wherein the second cell has PUSCH transmission within the duration of the first TTI,
   the power headroom of the second cell=maximum sending power of the user terminal-a PUSCH sending power maximum value of a preset TTI set in the second cell-a preset parameter,
   the preset parameter is 0, or the preset parameter comprises virtual transmission power of the second cell, or the preset parameter comprises PUCCH transmission power of the second cell, and
   the preset TTI set is located within the duration of the first TTI.

5. The PHR sending method according to claim 1, wherein the user terminal is located in a first cell and a second cell, the first cell is a cell in which the first TTI is located, and a TTI length of the first cell is at least twice a TTI length of the second cell; and
   when the target uplink resource is located in the second cell, the method further comprises:
   after a subframe in the first TTI ends, starting a periodicPHR-Timer and a prohibitPHR-Timer, wherein the periodicPHR-Timer is a timer used for preventing the PHR from being lost during sending, and the prohibitPHR-Timer is a timer used for preventing the user terminal from sending the PHR again in a short time.

6. An apparatus, comprising:
   a receiving module, configured to receive information comprises uplink resources in at least two cells, wherein TTI lengths of the at least two cells are different, each uplink resource in the at least two cells is an uplink resource that is located within duration of a first TTI, and the first TTI is a TTI in a cell that has a maximum TTI length and in which the user terminal is located;
   a determining module, configured to determine a target uplink resource, wherein the target uplink resource is an uplink resource that has an earliest start time and that is located within the duration of the first TTI;
   an obtaining module, configured to obtain a power headroom report; and
   a sending module, configured to send the power headroom report on the target uplink resource.

7. The apparatus according to claim 6, wherein the uplink resources in the at least two cells comprise a first uplink resource and a second uplink resource, the first uplink resource is located in a cell that has a minimum TTI length and in which the user terminal is located, the first uplink resource is located in an earliest TTI within the duration of the first TTI, and the second uplink resource is located in the first TTI; and the determining module is specifically configured to determine the first uplink resource as the target uplink resource.

8. The apparatus according to claim 6, wherein the user terminal is located in a first cell and a second cell, the first cell is a cell in which the first TTI is located, and a TTI length of the first cell is at least twice a TTI length of the second cell; and when the target uplink resource is located in the first TTI, the obtaining module is specifically configured to:

calculate power headroom of the first cell, wherein the power headroom of the first cell is calculated according to sending bandwidth of the first TTI; and calculate power headroom of the second cell, wherein the second cell has PUSCH transmission within the duration of the first TTI, the power headroom of the second cell=maximum sending power of the user terminal−a PUSCH sending power average value of a preset TTI set in the second cell−a preset parameter, the preset parameter is 0, or the preset parameter comprises virtual transmission power of the second cell, or the preset parameter comprises PUCCH transmission power of the second cell, and a TTI in the preset TTI set is located within the duration of the first TTI.

9. The apparatus according to claim 6, wherein the user terminal is located in a first cell and a second cell, the first cell is a cell in which the first TTI is located, and a TTI length of the first cell is at least twice a TTI length of the second cell; and when the target uplink resource is located in the first TTI, the obtaining module is specifically configured to:

calculate power headroom of the first cell, wherein the power headroom of the first cell is calculated according to sending bandwidth of the first TTI; and calculate power headroom of the second cell, wherein the second cell has PUSCH transmission within the duration of the first TTI, the power headroom of the second cell=maximum sending power of the user terminal−a PUSCH sending power maximum value of a preset TTI set in the second cell−a preset parameter, the preset parameter is 0, or the preset parameter comprises virtual transmission power of the second cell, or the preset parameter comprises PUCCH transmission power of the second cell, and the preset TTI set is located within the duration of the first TTI.

10. The apparatus according to claim 6, wherein the user terminal is located in a first cell and a second cell, the first cell is a cell in which the first TTI is located, and a TTI length of the first cell is at least twice a TTI length of the second cell; and when the target uplink resource is located in the second cell, the user terminal further comprises:

a start module, configured to: after a subframe in the first TTI ends, start a periodicPHR-Timer and a prohibit-PHR-Timer, wherein the periodicPHR-Timer is a timer used for preventing the PHR from being lost during sending, and the prohibitPHR-Timer is a timer used for preventing the user terminal from sending the PHR again in a short time.

11. A non-transitory computer-readable medium comprising instructions that, when executed, cause an apparatus to implement the following steps:

receiving information comprises uplink resources in at least two cells, wherein TTI lengths of the at least two cells are different, each uplink resource in the at least two cells is an uplink resource that is located within duration of a first TTI, and the first TTI is a TTI in a cell that has a maximum TTI length and in which the user terminal is located;

determining a target uplink resource, wherein the target uplink resource is an uplink resource that has an earliest start time and that is located within the duration of the first TTI; and sending a PHR on the target uplink resource.

12. The medium according to claim 11, wherein the uplink resources in at least two cells comprise a first uplink resource and a second uplink resource, the first uplink resource is located in a cell that has a minimum TTI length and in which the user terminal is located, the first uplink resource is located in an earliest TTI within the duration of the first TTI, and the second uplink resource is located in the first TTI; and the determining a target uplink resource comprises:

determining the first uplink resource as the target uplink resource.

13. The medium according to claim 11, wherein the user terminal is located in a first cell and a second cell, the first cell is a cell in which the first TTI is located, and a TTI length of the first cell is at least twice a TTI length of the second cell; and when the target uplink resource is located in the first TTI, the power headroom report is obtained in the following manner:

calculating power headroom of the first cell, wherein the power headroom of the first cell is calculated according to sending bandwidth of the first TTI; and calculating power headroom of the second cell, wherein the second cell has PUSCH transmission within the duration of the first TTI, the power headroom of the second cell=maximum sending power of the user terminal−a PUSCH sending power average value of a preset TTI set in the second cell−a preset parameter, the preset parameter is 0, or the preset parameter comprises virtual transmission power of the second cell, or the preset parameter comprises PUCCH transmission power of the second cell, and a TTI in the preset TTI set is located within the duration of the first TTI.

14. The medium according to claim 11, wherein the user terminal is located in a first cell and a second cell, the first cell is a cell in which the first TTI is located, and a TTI length of the first cell is at least twice a TTI length of the second cell; and when the target uplink resource is located in the first TTI, the power headroom report is obtained in the following manner:

calculating power headroom of the first cell, wherein the power headroom of the first cell is calculated according to sending bandwidth of the first TTI; and calculating power headroom of the second cell, wherein the second cell has PUSCH transmission within the duration of the first TTI, the power headroom of the second cell=maximum sending power of the user terminal−a PUSCH sending power maximum value of a preset TTI set in the second cell−a preset parameter, the preset parameter is 0, or the preset parameter comprises virtual transmission power of the second cell, or the preset parameter comprises PUCCH transmission power of the second cell, and the preset TTI set is located within the duration of the first TTI.

15. The medium according to claim 11, wherein the user terminal is located in a first cell and a second cell, the first cell is a cell in which the first TTI is located, and a TTI length of the first cell is at least twice a TTI length of the second cell; and when the target uplink resource is located in the second cell, further comprising instructions that, when executed, cause the apparatus to implement:

after a subframe in the first TTI ends, starting a periodicPHR-Timer and a prohibitPHR-Timer, wherein the periodicPHR-Timer is a timer used for preventing the PHR from being lost during sending, and the prohibitPHR-Timer is a timer used for preventing the user terminal from sending the PHR again in a short time.

\* \* \* \* \*